United States Patent [19]

Langer

[11] Patent Number: 4,489,657
[45] Date of Patent: Dec. 25, 1984

[54] INSULATING LAYER FOR A ROCKET PROPELLANT OR ROCKET MOTOR

[75] Inventor: Heinz-Güenther Langer, Gauting, Fed. Rep. of Germany

[73] Assignee: Messerschmitt-Boelkow-Blohm Gesellschaft mit beschraenkter Haftung, Munich, Fed. Rep. of Germany

[21] Appl. No.: 347,685

[22] Filed: Feb. 11, 1982

[30] Foreign Application Priority Data

Feb. 18, 1981 [DE] Fed. Rep. of Germany ....... 3105932

[51] Int. Cl.³ .............................................. C06D 5/06
[52] U.S. Cl. .................................. 102/290; 102/291; 102/374; 264/3 R
[58] Field of Search ............... 149/2, 23, 76; 264/3 R; 102/289–292, 374

[56] References Cited

U.S. PATENT DOCUMENTS

| | | | |
|---|---|---|---|
| 3,507,114 | 4/1970 | Webb | 102/290 X |
| 3,578,520 | 5/1971 | Dolan et al. | |
| 3,726,090 | 4/1973 | Betts | |
| 3,764,641 | 10/1973 | Ash | 264/3 R X |
| 3,807,272 | 4/1974 | Gray | 264/3 R X |
| 3,943,208 | 3/1976 | Ratte et al. | 264/3 R X |
| 3,986,910 | 10/1976 | McCulloch et al. | 149/20 X |
| 4,011,818 | 3/1977 | Stosz, Jr. et al. | 149/19.9 X |
| 4,098,627 | 7/1978 | Tompa et al. | 264/3 R X |
| 4,185,557 | 1/1980 | Gerrish, Jr. | 264/3 R X |
| 4,337,218 | 6/1982 | Byrd et al. | 264/3 R X |
| 4,365,557 | 12/1982 | Couture et al. | 102/364 X |
| 4,375,522 | 3/1983 | Braun | 102/290 X |

FOREIGN PATENT DOCUMENTS

| | | |
|---|---|---|
| 6600205 | 1/1969 | Fed. Rep. of Germany. |
| 2047336 | 4/1971 | Fed. Rep. of Germany. |
| 2758814 | 7/1978 | Fed. Rep. of Germany. |

Primary Examiner—Peter A. Nelson
Attorney, Agent, or Firm—W. G. Fasse; D. H. Kane, Jr.

[57] ABSTRACT

A rocket propellant or rocket motor is provided with an insulating layer between the fuel proper and the inner wall of the housing forming the combustion chamber. The insulating layer is made of a foamed synthetic material. The foaming insulating material is introduced into the housing under pressure after the solid fuel body has been centered in the housing with a spacing between the inner housing wall and the fuel body the front face of which is covered with a synthetic material film for the subsequent removal of the layer of foamed insulating material from the front face of the fuel body. In an alternative method the inner surface of the combustion chamber wall may be coated with a layer of foamed insulating material prior to the introduction of the fuel into the combustion chamber, said layer of foamed insulating material forming a tubular member.

11 Claims, 3 Drawing Figures

INSULATING LAYER FOR A ROCKET PROPELLANT OR ROCKET MOTOR

CROSS-REFERENCE TO RELATED APPLICATION

The present application corresponds to German patent application No. P 31 05 932.5, filed in the Federal Republic or Germany on Feb. 18, 1981. The priority of said Germany filing date is claimed for the present application.

BACKGROUND OF THE INVENTION

The invention relates to an insulating layer for a rocket propellant or for a rocket motor. More specifically, the invention relates to an insulating layer installed in a rocket propellant or motor of the front or face burner type.

Rocket propellants or rocket motors of the front burner type are used in ever increasing numbers in so-called ram jet rockets. The propellant or rocket motor comprises an insulation layer which insulates the inner wall surface of the combustion chamber from the solid fuel body on all sides except the facing side from which the burning jet stream is ejected. Such insulating layers must satisfy, among other requirements, three primary requirements. First, the insulating layer must thermally insulate the fuel or propellant body against any heating of the rocket or flying body that may result due to air friction. Such insulation is necessary in order to prevent impairing of the burn-up and thus of the pressure work range due to a temperature increase of the fuel or propellant body. The second purpose for the insulation is to protect the wall of the combustion chamber during the combustion of the fuel body against a too large heat-up. The third purpose of the insulation layer is not an insulating purpose, but rather a bonding purpose. The insulating layer shall be able to uniformly and rigidly bond the fuel or propellant body to the inner surface of the combustion chamber wall so as to prevent a separation of the fuel body from the combustion chamber wall. Such separation would result in hollow spaces into which the flame could flash-back in an undesirable manner.

German patent publication (DE-OS) No. 2,758 814 discloses an insulation layer for a rocket propellant which consists of an aziridin and a polybutadiene which includes hydroxyl end groups and which has been cured or hardened by means of a polyisocyanate hardener. This type of insulating layer is applied by covering the inner surface of the combustion chamber wall with the already hardened insulating layer. Thereafter, the propellant mass which has not yet been hardened is poured into the combustion chamber having the inner walls aligned with the already hardened insulating layer. Thereafter the so poured propellant mass is cured or hardened.

It is also known, that the insulating layer reduces the propellant or rocket motor diameter thereby also reducing the range of the respective rocket or flying body because the combustion chamber volume is usually predetermined, for example, by the size of the rocket and can therefore not be easily increased. Thus, it is desirable to achieve the above three purposes with an insulating layer which is as thin as possible, while still satisfying the mentioned requirements.

OBJECTS OF THE INVENTION

In view of the above it is the aim of the invention to achieve the following objects singly or in combination:

to provide an insulating layer of the type described between the propellant or fuel body and the inner surface of the combustion chamber, which layer has a reduced thickness and which satisfies the above mentioned requirements;

to provide an insulating layer which will intimately bond not only to the propellant or fuel body as the latter hardens, but which will properly bond to the fuel body and to the inner surface of the combustion chamber wall; and to provide a method for introducing an insulating layer between the propellant or fuel body and the inner surface wall of the combustion chamber in such a way that the insulating layer may cure while it is already in place.

SUMMARY OF THE INVENTION

According to the invention there is provided an insulating layer between the fuel or propellant body and the combustion chamber inner wall surface of a rocket motor, especially for so-called front burner rocket types which insulation layer is made of a foamed synthetic material, preferably foamed polybutadiene.

A rocket motor according to the invention, or more specifically an insulating layer according to the invention is produced by a method according to the invention in which the fuel or propellant body is first centered in the combustion chamber to form a gap between the combustion chamber inner wall surface and the solid fuel body. The so formed gap is then filled with synthetic foaming material, for example, a polybutadiene foaming material which is then permitted to cure or harden while it is already in place in the gap. This method permits the formation of an effective insulation layer which has a reduced thickness as compared to prior art layers of this type and which surprisingly satisfies the above requirements.

Heretofore the use of a solid, not foamed insulating material for the present purpose was deemed necessary by those skilled in the art because it is logically to be expected that a foamed synthetic material, due to its smaller mass as compared to a solid synthetic material, would be destroyed much more rapidly by the combustion flame than a compact, solid synthetic material. Accordingly, the impeding of the burn off or, stated differently, the protection of the combustion chamber against excessive heating would be expected to be worse if a foamed synthetic material is used as the insulating layer as compared to an insulating layer of a compact, solid synthetic material. Furthermore, due to the smaller material strength of a foaxed synthetic material as compared to a solid synthetic material, it is to be expected that the foamed synthetic material would separate itself more easily from the inner wall surface of the combustion chamber than a compact, solid synthetic material. In spite of these considerations, it has been found, surprisingly, that an insulating layer made of foamed synthetic material has at least as good qualities as an insulating layer of compact, solid synthetic material as far as the combustion chamber protection and the intimate bonding to the combustion chamber wall are concerned. Additionally, the foamed insulating material has a far superior thermal insulation characteristic as compared to solid, compact synthetic material, whereby according to the invention the layer thickness may be substantially reduced. According to the invention the layer thickness may be within the range of 0.4 to 1.2 mm as compared to a layer thickness required heretofore in the range of 4 to 10 mm when a solid synthetic material is used. This result is considered to be surprising, especially with regard to the requirement of combustion chamber protection and intimate bonding, not only between the insulating layer and the insulating layer, but also between the solid fuel body and the inner surface wall of the combustion chamber.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
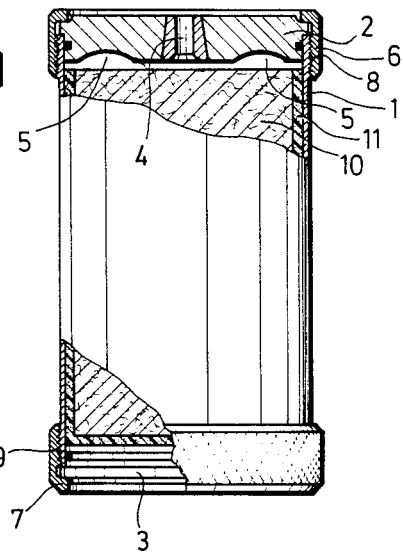
FIG. 1 is a side elevational view of a rocket motor according to the invention, shown partially in section.

FIG. 1 shows the present gas generator comprising a housing 1 forming a combustion chamber with inwardly facing surfaces. End cover members are secured to each end or so-called facing side of the housing or chamber 1. One end cover member 2 forms a cover proper. The other end cover member forms a bottom 3. The cover 2 is provided with a nozzle 4 which is centrally located. Further, the inwardly facing surface of the cover 2 is provided with recesses 5 for the ignition of the nozzle facing end of a propellant body 10. The cover 2 and the bottom 3 are secured to the housing 1, for example, by cap screws 6 and 7 respectively. These cap crews cooperate with respective threadings 8 and 9 at the upper and lower end of the housing 1. The housing 1 is made of a thin steel jacket having a wall thickness of one or a few millimeters as is conventional.

The solid fuel body or propellant body 10 is held in the combustion chamber formed by the housing 1 and the cover 2 as well as the bottom 3. The body 10 and the inner dimensions of the combustion chamber are such that a gap is formed between the body 10 and the inner wall surface of the combustion chamber 1. This gap is filled with an insulating layer 11 of foamed synthetic material. This layer 11 is also present between the lower facing end of the body 10 and the bottom 3.

The just described gas generator is of the so-called front burner type. Stated differently, the burn-up front or face of the solid fuel body or propellant 10 travels from the ignition point at the recesses 5 in the axial direction toward the bottom 3. A solid fuel of the following composition has been found to be rather suitable for the present purposes in making the propellant solid fuel body 10. The composition or mixture comprises:

about 25% by weight of ammonium perchlorate as an oxidator;
about 25% by weight of polybutadiene as a binder agent;
about 40% by weight of elemental boron;
about 10% by weight of filler or additives of a conventional type.

It has been found that polybutadiene foamed under pressure is especially suitable as a foamed synthetic material for forming the inslating layer 11. This type of pressure foamed synthetic material is especially advantageous if the solid fuel materials have the above mentioned composition because then the bonding of the insulating layer 11 to the solid fuel body 10 is especially effective. The bonding to the combustion chamber is also good.

Figure 2:
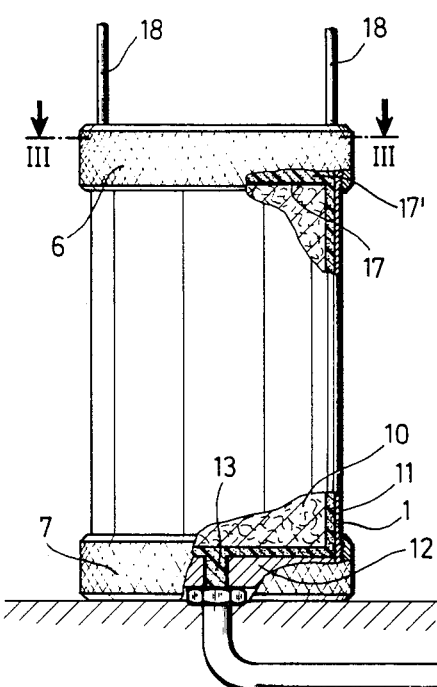
FIG. 2 is a view of an apparatus for performing the present method in manufacturing a gas generator according to the invention.
Figure 2:
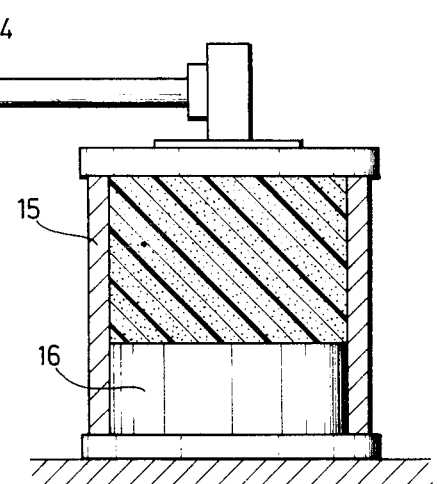

FIG. 2 shows an apparatus for manufacturing the gas generator according to the invention. Initially the housing 1 is arranged in a vertical orientation and the bottom 3 is replaced by a closure plate 12 provided with a central access port 13. The plate 12 may be secured to the housing 1 in the same manner as the bottom 3 by means of the cap screw 7.

Figure 3:
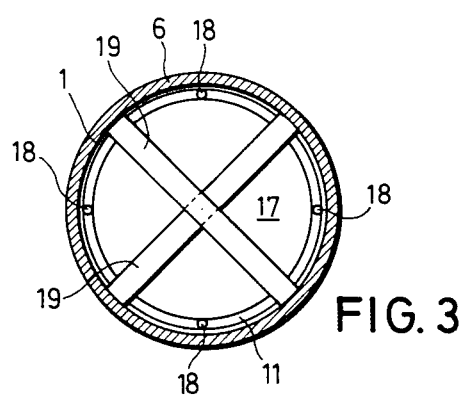
FIG. 3 is a sectional view along section line III—III in FIG. 2.

A conduit 14 is conventionally secured to the inlet port 13 and to an outlet of a piston cylinder arrangement 15 in which the piston 16 is pressurized for injecting not yet foamed synthetic material into the combustion chamber 1 after the piston cylinder arrangement 15 has been filled with a foamable two component polybutadiene mass which develops carbon dioxide. Prior to pressurizing the piston 16 the solid fuel body 10 is inserted into the combustion chamber and the upwardly facing front end of the body 10 is covered by a film 17, for example, a self-sticking synthetic material film of conventional construction. Thereafter, the solid fuel body 10 is uniformly centered within the housing for the formation of the gap to be taken up by the insulating layer 11. This centering is accomplished by inserting wires 18 corresponding in their diameter to the desired gap width and thus to the thickness of the insulating layer 11. The wires 18 are uniformly distributed, preferably at equal circumferential spacings around the solid fuel body 10 as best seen in FIG. 3.

After the body 10 has been centered in the housing 1 at least one stop member 19 is placed on top of the housing and held in place by the cap screw 6 which normally holds the cover 2. As shown in FIG. 3 the stop 19 may comprise two cross bars arranged in a cross-over relationship. The axial spacing between the inwardly facing surface of the cross bars 19 and the inner surface of the plate 12 corresponds to the axial length of the solid fuel body 10 plus the desired thickness of the insulating layer between the lower end surface of the body 10 and the plate 12, or rather in the finished structure between the lower end face of the body 10 and the bottom 3. To this extent, corresponding to the desired gap width, the solid fuel body 10 may axially yield prior to the injection of the synthetic foam material. In practice, the body will move slightly axially upwardly as the foam material is being injected.

After the foaming of the foam material has been initiated, the resulting expansion pressure enhanced by the movement of the piston 16 in the piston cylinder arrangement 15 propels the foaming material through the conduit 14 into the inlet port 13 below the lower surface of the solid fuel body 10. As the foaming material enters the combustion chamber it distributes radially outwardly and then axially upwardly in the gap formed as described above until the body 10 is stopped in its axial movement by the cross bars 19. As the foaming mass travels axially upwardly the wires 18 are gradually withdrawn starting at a time when the foaming material begins to enter into the upper half of the gap.

After about an hour the foamed material is solidified and after about ten hours it is completely cured. Any foam 17' that may have travelled into the space above the solid body 10 is roughly removed whereupon the cover film 17 is also pulled off. Thus, it is assured that the facing surface of the solid fuel body 10 opposite the ignition recesses 5 is not contaxinated with foamed synthetic material.

Experiments have shown that in a rocket motor constructed according to the invention and having the following features the bonding of the insulating layer 11 to the inner surface of the combustion chamber 1 was able to withstand an acceleration of at least 25 gs. In this experiment the solid fuel body 10 had a weight of approximately 24 kg and a diameter of 224 mm, whereby the insulating layer had a thickness of 4 mm.

The insulating layer according to the invention of foamed synthetic material may have a thickness which corresponds only to 50% of the thickness of a conventional solid, compact insulating synthetic material layer. Yet, the thermal insulation of the layer formed according to the invention is substantially improved, for example, at a flight speed of the flight body in the range of Mach 2. Even the combustion chamber protection is at least as good as that in a conventional rocket motor having a solid material insulating layer twice as thick as the foamed material insulating layer according to the invention.

Further, according to the invention it is possible to increase the diameter of the solid fuel body 10 due to the reduced thickness of the insulating layer 11. As a result the rockets according to the invention have a range which is, for example 5% larger than the range of comparable conventional rockets.

It is possible to modify the described method of manufacturing the present rocket motors. Particularly it is possible to first form a tubular insulating layer inside the housing 1 by foaming and curing a synthetic material foaming mass inside the housing 1. Thereafter the not yet cured mass forming the solid fuel body 10 is poured into the housing 1 lined with the tubular insulating layer, whereupon the mass for the body 10 is cured.

Although the invention has been described with reference to specific example embodiments, it is to be appreciated that it is intended to cover all modifications and equivalents within the scope of the appended claims.

What is claimed is:

1. A front or face burning type rocket motor, comprising housing means forming a combustion chamber and including two end cover members, nozzle means in one of said end cover members, fuel means having a nozzle facing end for ignition in said housing means, and an insulating layer in said housing means for spacing said fuel means from said housing means at least at those sections of the housing means other than said end cover members, said insulating layer consisting exclusively of a single layer of synthetic foamed polybutadiene insulating material in said housing.

2. The rocket motor of claim 1, wherein said fuel means comprise about 25% of ammonium perchlorate as an oxidizer, about 25% of polybutadiene as a binder material, about 40% of elemental boron, and the remainder being filler materials, said percentages being given by weight.

3. A method of manufacturing a rocket motor, comprising the following steps: providing a combustion chamber having end cover members and a nozzle in one of said end cover members, centering a solid fuel body having a given length in said combustion chamber so that a gap is provided between the solid fuel body and inner surfaces of said combustion chamber, introducing a synthetic polybutadiene foaming insulation material into said gap, and curing the synthetic polybutadiene foaming insulation material for forming a single insulation layer in said gap, whereby the resulting single insulation layer consists exclusively of foamed polybutadiene without any other layers.

4. The method of claim 3, comprising the further step of combining two components to form a foaming two component polybutadiene insulation mass, said combining taking place prior to or during said introducing.

5. The method of claim 3 or 4, wherein said gap is formed by inserting spacer members between said solid fuel body and inner surfaces of said combustion chamber.

6. The method of claim 5, wherein said spacer members are wire members which are distributed about the circumference of the solid fuel body to extend substantially in parallel to a central longitudinal axis of said rocket motor, and withdrawing said wire members during said introducing of said synthetic foaming insulation material.

7. The method of claim 5, further comprising arranging said combustion chamber so that its longitudinal axis extends substantially vertically temporarily replacing said cover member with the nozzle therein by open stop means, temporarily replacing the other cover member by a bottom plate having a substantially centrally located inlet port therein, said bottom plate being spaced from said open stop means by a distance larger than the given length of said solid fuel body, introducing said synthetic foaming insulation material into said combustion chamber through said inlet port in said bottom plate whereby the synthetic foaming insulation material fills said gap by flowing from said inlet port first radially outwardly and then axially upwardly, and then again replacing said open stop means by said cover member with the nozzle therein and said bottom plate by said other cover member.

8. The method of claim 7, further comprising covering said solid fuel body at its end facing said open stop means with a covering film prior to said introducing of the synthetic foamed insulation material, said film sticking to said facing end.

9. The method of claim 7, wherein at least one cross bar is used for said stop means, said cross bar extending across the combustion chamber.

10. The method of claim 3, wherein said synthetic foamed insulation material is introduced into said gap under a certain gage pressure.

11. The method of claim 10, wherein said gage pressure is within the range of 0 to 145 psi.

* * * * *